United States Patent [19]

Ashida et al.

[11] Patent Number: 5,008,150

[45] Date of Patent: Apr. 16, 1991

[54] PHOTOGRAPHIC SUPPORT WITH AN UNDERCOATING LAYER ON A RESIN COATED BASE SHEET

[75] Inventors: Tetsuya Ashida, Tokyo; Touru Noda, Matsudo, both of Japan

[73] Assignee: Mitsubishi Paper Mills Limited, Tokyo, Japan

[21] Appl. No.: 252,138

[22] Filed: Oct. 3, 1988

[30] Foreign Application Priority Data

| | | | |
|---|---|---|---|
| Oct. 2, 1987 | [JP] | Japan | 62-250466 |
| Oct. 16, 1987 | [JP] | Japan | 62-261417 |
| Dec. 22, 1987 | [JP] | Japan | 62-324965 |

[51] Int. Cl.[5] .......................... B32B 27/08; G03C 1/37; C08L 89/00

[52] U.S. Cl. .......................... 428/340; 428/513; 428/575; 428/498; 427/42; 427/40; 427/41; 284/176.1; 430/532; 430/538; 430/537

[58] Field of Search ................ 428/340, 498, 515, 513

[56] References Cited

FOREIGN PATENT DOCUMENTS 58-48892 10/1983 Japan .
59-142543 8/1984 Japan .
59-226343 12/1984 Japan .
59-226344 12/1984 Japan .
61-107343 5/1986 Japan .
61-236546 10/1986 Japan .
62-30244 2/1987 Japan .

*Primary Examiner*—P. C. Sluby
*Attorney, Agent, or Firm*—Cushman, Darby & Cushman

[57] ABSTRACT

A photographic support having an undercoating layer on a resin coated base sheet, said undercoating layer comprising (a) a hydrophilic colloid, and (b) a special amphoteric surface active agent, or (a) a hydrophilic colloid, (b') a p-hydroxybenzoic acid ester and/or a special amphoteric surface active agent and (c) a special isothiazoline-3-one compound, provides excellent coating and adhesive properties to a photographic emulsion layer formed on the undercoating layer.

9 Claims, No Drawings

PHOTOGRAPHIC SUPPORT WITH AN UNDERCOATING LAYER ON A RESIN COATED BASE SHEET

BACKGROUND OF THE INVENTION

This invention relates to a photographic support, and more particularly to a photographic support having an undercoating layer on a substrate (or base sheet) coated with a resin on both sides.

In recent years, as a photographic support, there has been used paper coated with a resin such as a polyolefin resin on both sides thereof. But since surfaces of such a water resistant photographic support are hydrophobic, it is difficult to strongly adhere a photographic emulsion layer using gelatin as a binder to the photographic support. Thus, such a hydrophobic surface of the resin such as a polyolefin is subjected to an activating treatment such as a corona discharge treatment, flame treatment, chemical treatment or the like, followed by coating with a photographic emulsion. But according to this method, since the activity of the thus activated resin surface is lowered with the lapse of time, the adhesion of the photographic emulsion layer becomes poor. Further, non-uniform static charge on the resin surface often causes non-uniform emulsion coating.

In order to improve photographic properties such as prevention of deterioration of activating treatment effect with the lapse of time, improvement of coating unevenness, and the like, it is proposed to form a hydrophilic colloid film, that is an undercoating layer, on the surface of a resin such as polyolefin immediately after the activation treatment (e.g. Japanese Patent Unexamined Publication (Laid-Open) No. 62-30244). In this reference, there have been disclosed various techniques for improving coating properties such as coatability and mottle inprovement and adhesive properties of the undercoating layer and the photographic emulsion layer. But such techniques cannot satisfy recent requirements for high speed coating of the photographic emulsion and thinning of the photographic emulsion layer considering the increase of productivity.

On the other hand, since a hydrophilic colloid such as gelatin is contained in the undercoating layer, putrefaction or decomposition takes place due to an influence of microorganisms such as bacteria, yeasts, molds, etc. In order to prevent such putrefaction or decomposition, it is proposed to use a compound of the formula:

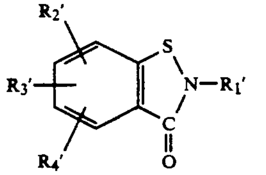

wherein $R_1'$ is hydrogen, an alkyl group or the like; $R_2'$, $R_3'$ and $R_4'$ are independently hydrogen, halogen, an alkyl group or an alkoxy group, in place of a known preservative such as a phenol, a p-hydroxybenzoic acid ester, or the like in the undercoating layer (Japanese Patent Examined Publication No 58-48892, Japanese Patent Unexamined Publication (Laid-Open) No. 61-107343, etc.). Further it is also proposed to use in an undercoating layer a compound of the formula:

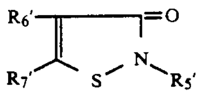

wherein $R_5'$ is hydrogen, a straight- or branched-chain alkyl group, a cyclic alkyl group, an alkenyl group, an aralkyl group, an aryl group, a heterocyclic group, or the like; and $R_6'$ and $R_7'$ are independently hydrogen, halogen, an alkyl group, a cyclic alkyl group, an aryl group, a cyano group, an alkylthio group, an arylthio group, an alkylsulfoxy group, an alkylsulfonyl group or a heterocyclic group, in place of a known preservative such as a phenol, a p-hydroxybenzoic acid ester, or the like in the undercoating layer (Japanese Patent Unexamined Publication (Laid-Open) Nos. 59-226344, 59-226343, etc.) In addition, it is also proposed to use the above-mentioned two kinds of compounds in the undercoating layer (Japanese Patent Unexamined Publication (Laid-Open) No. 59-142543).

But when these undercoating layers are used, coating properties and adhesive properties against high speed coating of the photographic emulsion layer formed on the undercoating layer becomes insufficient. As mentioned above, when putrefaction and decomposition of a solution for undercoating layer are to be prevented, high coating properties and adhesive properties of the photographic emulsion layer becomes worse. On the other hand, when the coating properties and adhesive properties of the photographic layer are to be improved, the solution for undercoating layer is suffered from putrefaction and decomposition so as to make it impossible to store for a long period of time.

SUMMARY OF THE INVENTION

It is an object of this invention to provide a photographic support having an undercoating layer on a resin coated base sheet suitable for high speed coating of a photographic emulsion and thinning of a photographic emulsion layer and excellent in adhesive properties with the photographic emulsion layer.

It is another object of this invention to provide a photographic support having an undercoating layer on a resin coated base sheet showing no putrefaction and no decomposition with the lapse of time and improved in coating properties and adhesive properties of the photographic emulsion layer.

This invention provides a photographic support comprising a base sheet and formed thereon an undercoating layer comprising.

(a) a hydrophilic colloid, and (b) at least one compound selected from the group consisting of a compound of the formula:

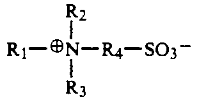

(I)

wherein $R_1$, $R_2$ and $R_3$ are independently hydrogen or an alkyl group; and $R_4$ is an alkylene group, and a compound of the formula:

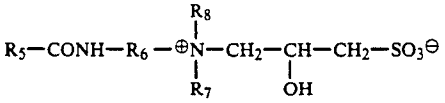 (II)

wherein $R_5$, $R_7$ and $R_8$ are independently hydrogen or an alkyl group; and $R_6$ an alkylene group, the coating amount of said undercoating layer being 0.01 g/m$^2$ to 1.0 g/m$^2$ on dry basis, whereby high speed emulsion coating becomes possible.

This invention also provides a photographic support comprising a base sheet and formed thereon an undercoating layer comprising (a) a hydrophilic colloid, (b') at least one member selected from the group consisting of p-hydroxybenzoic acid esters and compounds represented by the formulae:

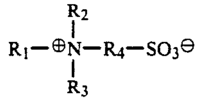 (I)

and

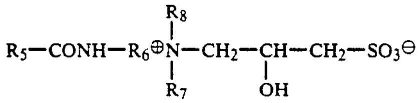 (II)

wherein $R_1$ through $R_8$ are as defined above, and (c) at least one compound selected from the group consisting of a compound of the formula:

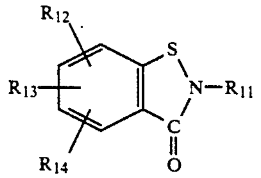 (III)

wherein $R_{11}$ is hydrogen, an alkyl group or an alkoxy group; $R_{12}$, $R_{13}$ and $R_{14}$ are independently hydrogen, halogen, an alkyl group, an alkoxy group, a cyano group or a nitro group, and a compound of the formula:

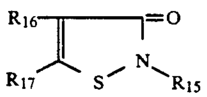 (IV)

wherein $R_{15}$ is hydrogen, an alkyl group, a cycloalkyl group, an alkenyl group, an aralkyl group, an aryl group, a group of the formula: —CONHR$_9$ (in which $R_9$ is an alkyl group, an aryl group, an alkylthio group, an arylthio group, an alkylsulfonyl group or an arylsulfonyl group), or a heterocyclic group; and $R_{16}$ and $R_{17}$ are independently hydrogen, halogen, an alkyl group, a cycloalkyl group, an aryl group, a heterocyclic group, a cyano group, an alkylthio group, an arylthio group, an alkylsulfoxide group, an alkylsulfinyl group or an alkylsulfonyl group.

DESCRIPTION OF THE PREFERRED EMBODIMENTS

In order to improve coating unevenness of a photographic emulsion which is coated on an undercoating layer at high speed coating without damaging photographic emulsion performance, it is necessary to form a undercoating layer comprising (a) a hydrophilic colloid and (b) at least one compound selected from the group consisting of a compound of the formula:

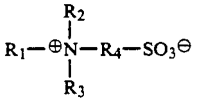 (I)

wherein $R_1$, $R_2$ and $R_3$ are independently hydrogen or an alkyl group preferably having 1 to 18 carbon atoms; and $R_4$ is an alkylene group preferably having 1 to 8 carbon atoms, and a compound of the formula:

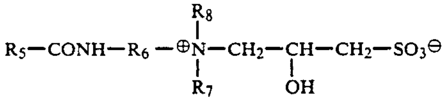 (II)

wherein $R_5$ is hydrogen or an alkyl group preferably having 1 to 18 carbon atoms; $R_6$ is an alkylene group preferably having 1 to 8 carbon atoms; $R_7$ and $R_8$ are independently hydrogen or an alkyl group preferably having 1 to 8 carbon atoms, on a base sheet coated with a resin, the coating amount of said undercoating layer being 0.001 g/m$^2$ to 1.0 g/m$^2$ on dry basis.

Even if other anionic, cationic, and nonionic surface active agents similar to the compounds of the formulae (I) and (II) in surface chemical activity are used, there arise various disadvantages in that no uniform solution can be obtained together with gelatin, uniform coating is impossible although a surface tension lowering effect is large, bad influences appear on photographic properties, these phenomena being unsuitable for practical use.

Preferable examples of the compounds of the formulae (I) and (II) are as follows:

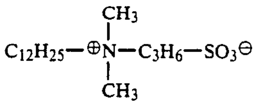 (I-1)

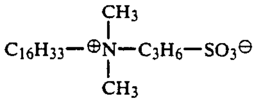 (I-2)

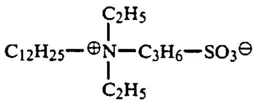 (I-3)

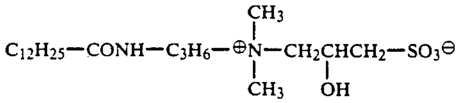 (II-1)

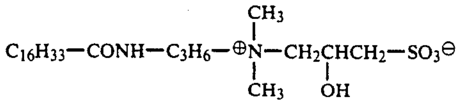 (II-2)

-continued

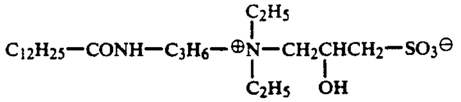

(II-3)

These compounds can be used alone or as a mixture thereof.

The adding amount of the compounds of the formulae (I) and (II) changes depending on coating conditions, coating speed, coating amount, drying conditions, etc. In general, 0.1 to 10% by weight, more preferably 0.2 to 4% by weight of the compounds of the formulae (I) and (II) (on dry basis) is used based on the weight of the hydrophilic colloid (a) such as gelatin. If the adding amount is too much, undesirable influences appear on photographic properties and an effect for maintaining photographic emulsion properties is decreased, whereas if the adding amount is too small, the effect for improving the coating unevenness of photographic emulsion is insufficient.

The solution for undercoating layer may contain various additives such as a matting agent, an antistatic agent, an antihalation agent, dyes for coloring, pigments, an anti-fogging agent, a hardner for gelatin, a fluorescent brightening agent, other surface active agents, etc., depending on purposes.

The undercoating layer can be formed by coating a solution comprising a hydrophilic colloid such as gelatin and at least one compound selected from the formulae (I) and (II) on a resin surface of a base sheet activated by, for example, corona discharge treatment by a conventional method.

As the hydrophilic colloid, gelatin is usually used. As the gelatin, there can be used not only so-called line-treated gelatin, acid-treated gelatin, enzyme-treated gelatin, etc., but also modified gelatins generally used in this art.

If the undercoating layer is too thin sufficient adhesive strength cannot be obtained. On the other hand, if the undercoating layer is too thick, although the adhesive strength is improved, there undesirably arise a curl, blocking to the rear side when stored in wound up state, and the like. Therefore, the coating amount of undercoating layer is preferably 0.01 g/m$^2$ to 1.0 g/m$^2$, more preferably 0.02 g/m$^2$ to 0.5 g/m$^2$ on dry basis.

In order to prevent the undercoating layer from putrefaction or decomposition by microorganisms such as bacteria, yeasts, molds, etc., a preservative is added thereto. But considering the improvement of coating properties and adhesive properties of the photographic emulsion layer to be coated on the undercoating layer, it is preferable to form an undercoating layer comprising the following composition:

(a) a hydrophilic colloid, (b') at least one member selected from the group consisting of p-hydroxybenzoic acid esters and compounds represented by the formulae:

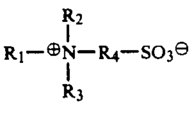

(I)

and

-continued

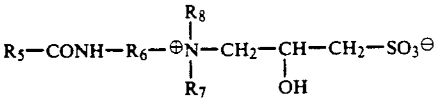

(II)

wherein $R_1$ through $R_8$ are as defined above, and (c) at least one compound selected from the group g of a compound of the formula:

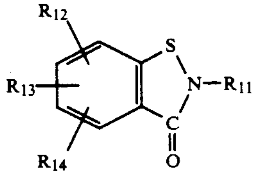

(III)

wherein $R_{11}$ is hydrogen, an alkyl group having preferably 1 to 36 carbon atoms, more preferably 1 to 18 carbon atoms, or an alkoxy group having preferably 1 to 36 carbon atoms, more preferably 1 to 18 carbon atoms; $R_{12}$, $R_{13}$ and $R_{14}$ are independently hydrogen, a halogen atom such as Cl, F, Br or I, an alkyl group preferably having 1 to 6 carbon atoms, an alkoxy group preferably having 1 to 6 carbon atoms, a cyano group or a nitro group;

and a compound of the formula:

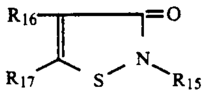

(IV)

wherein $R_{15}$ is hydrogen, an alkyl group having preferably 1 to 36 carbon atoms, more preferably 1 to 18 carbon atoms, a cyclic alkyl group having preferably 3 to 12 carbon atoms, more preferably 3 to 6 carbon atoms, an alkenyl group having preferably 1 to 36 carbon atoms, an aralkyl group having preferably 1 to 36 carbon atoms, more preferably 1 to 18 carbon atoms, an aryl group having preferably 1 to 36 carbon atoms, more preferably 1 to 18 carbon atoms, a group of the formula $-CONHR_9$ (in which $R_9$ is an alkyl group preferably having 1 to 18 carbon atoms, an aryl group preferably having 1 to 18 carbon atoms, an alkylthio group preferably having 1 to 18 carbon atoms, an arylthio group preferably having 1 to 18 carbon atoms, an alkylsulfonyl group preferably having 1 to 18 carbon atoms, or an arylsulfonyl group preferably having 1 to 18 carbon atoms), or a heterocyclic cyclic group; and $R_{16}$ and $R_{17}$ are independently hydrogen, a halogen atom such as F, Cl, Br or I, an alkyl group having preferably 1 to 18 atoms, more preferably 1 to 9 carbon atoms, a cycloalkyl group having preferably 3 to 12 carbon atoms, more preferably 3 to 6 carbon atoms, an aryl group having preferably 1 to 18 carbon atoms, more preferably 1 to 9 carbon atoms, a heterocyclic group, a cyano group, an alkylthio group having preferably 1 to 18 carbon atoms, more preferably 1 to 9 carbon atoms, an arylthio group having preferably 1 to 18 carbon atoms, more preferably 1 to 9 carbon atoms, an alkylsulfoxide group having preferably 1 to 18 carbon atoms, more preferably 1 to 9 carbon atoms, an alkylsulfoxide group having preferably 1 to 18 carbon atoms, more preferably 1 to 9 carbon atoms, an alkylsulfinyl group having preferably 1 to 18 carbon atoms, more preferably 1 to 9 carbon atoms, or an alkylsulfonyl group having preferably 1 to 18 carbon atoms, more preferably 1 to 9 carbon atoms.

In the formula (IV), the alkenyl group includes, for example, a vinyl group, an allyl group, etc.; the aralkyl group includes, for example, a benzyl group, a phenethyl group, a cumyl group, etc.; the aryl group includes, for example, a phenyl group, a naphthyl group, etc.; the heterocyclic group includes, for example, a thiofuryl group, an oxazinyl group, an oxazolidinyl group, an oxazolinyl group, an oxazolyl group, a furyl group, a pyridyl group, etc.

In the prior art references, it is disclosed that the compounds of the formulae (III) and/or (IV) can be used as a preservative in place of known presentatives such as p-hydroxybenzoic acid esters in a very small amount compared with the case of using the p-hydroxybenzoic acid esters. But there is no description nor suggestion in the prior art references that the undercoating layer comprising at least one compound of the formulae (III) and/or (IV), at least one member selected from the group consisting of p-hydroxybenzoic acid esters and compounds of the formulae (I) and (II), and a hydrophilic colloid such as gelatin can remarkably improve the coating properties and adhesive properties of the photographic emulsion to be coated on the undercoating layer. This is a very surprising effect of the present invention.

Preferable examples of the compounds of the formula (III) are 1,2-benzisothiazoline-3-one, 2-methyl-1,2-benzisothiazoline-3-one, 2-ethyl-1,2-benzisothiazoline-3-one, 2-methoxy-1,2-benzisothiazoline-3-one, 2-ethoxy-1,2-benzisothiazoline-3-one, 5-chloro-1,2-benzisothiazoline-3-one, 5-methyl-1,2-benzisoliazoline-3-one, 6-ethoxy-1,2-benzisothiazoline-3-one, 6-cyano-1,2-benzisothiazoline-3-one, 5-nitro-1,2-benzisothiazoline-3-one, etc.

Preferable examples of the compounds of the formula (IV) are 2-(N-methylcarbamoyl)-3-isothiazoline-3-one, 5-methyl-2-(N-methylcarbamoyl)-3-isothiazoline-3-one, 4-bromo-5-methyl-2-(N-methylcarbamoyl)-3-isothiazoline-3-one, 4-cyano-5-methylthio-2-(N-methylcarbamoyl)-3-isothiazoline-3-one, 2-(N-n-butylcarbamoyl)-3-isothiazoline-3-one, 5-methyl-2-(N-phenylcarbamoyl)-3-isothiazoline-3-one, 4-bromo-5-methyl-2-(N-3-chlorophenylcarbamoyl)-3-isothiazoline-3-one, 4-cyano-5-methylthio-2-(N-3-chlorophenylcarbamoyl)-3-isothiazoline-3-one, 2-(N-3-chlorophenylcarbamoyl)-3-isothiazoline-3-one, 5-bromomethyl-2-(N-2-chlorophenylcarbamoyl)-3-isothiazoline-3-one, 5-methyl-2-(N-3,4-dichlorophenylcarbamoyl)-3-isothiazoline-3-one, 5-methyl-2-(N-4-tosylcarbamoyl)-3-isothiazoline-3-one, 4-bromo-5-methyl-2-(N-4-tosylcarbamoyl)-3-isothiazoline-3-one, 2-(N-1-propylcarbamoyl)-3-isothiazoline-3-one, 2-(N-4-methoxyphenylcarbamoyl)-3-isothiazoline-3-one, 2-(N-3-nitrophenylcarbamoyl)-3-isothiazoline-3-one, 2-(N-3,4-dichlorophenylcarbamoyl)-3-isothiazoline-3-one, 2-(N-carboethoxymethylcarbamoyl)-3-isothiazoline-3-one, 5-methyl-2-(N-ethylcarbamoyl)-3-isothiazoline-3-one, 2-cyclohexyl-3-isothiazoline-3-one, 2-benzyloxy-3-isothiazoline-3-one, 5-chloro-2-methyl-3-isothiazoline3-one, 4,5-dichloro-2-methyl-3-isothiazoline-3-one, 4-methyl-2-(3,4-dichlorophenyl)-3-isothiazoline-3-one, 4,5-dichloro-2-benzyl-3-isothiazoline-3-one, 4-bromo5-chloro-2-methyl-3-isothiazoline-3-o ne, 2-hydroxymethyl-3-isothiazoline-3-one, 2-(β-diethylaminoethyl)-3-isothiazoline-3-one, 2-n-propyl-3-isothiazoline-3-one·hydrochloric acid salt, 5-chloro-2-methyl-3-isothiazoline-3-one·hydrochloric acid salt, 2-n-dodecyl-3-isothiazoline-3one, 2-n-tetradecyl-3-isothiazoline-3-one, 2-(4-chlorobenzyl)-3-isothiazoline-3-one, 2-(2,4-dichlorobenzyl)-3-isothiazoline-3-one, 2-(4-methylbenzyl)-3-isothiazoline-3-one, 2-(2-phenylethyl)-3-isothiazoline-3-one, 2-n-dodecyl-3-isothiazoline-3-one, 2-n-octyl-3-isothiazoline-3-one, 5-chloro-2-methyl-3-isothiazoline-3-one·monochloroacetic acid salt, 4,5-dichloro-2-methyl-3-isothiazoline-3-one·monochloroacetic acid salt, 2-benzyl-3-isothiazoline-3-one·monochloroacetic acid salt, etc.

It is preferable to use the 1,2-benzisothiazoline-3-one compound of the formula (III) and/or the isothiazoline-3-one compound of the formula (IV) in an amount of $1 \times 10^{-5}$ to 10% by weight, more preferably $1 \times 10^{-4}$ to 1% by weight, based on the weight of the hydrophilic colloid. When the amount is too small, the preservative effect is insufficient and sufficient properties of the undercoating layer cannot be obtained. On the other hand, when the amount is too much, the preservative effect is sufficient, but the adhesive properties of the photographic emulsion layer are lowered.

The compounds of the formulae (III) and (IV) can be dissolved in water or an organic solvent which does not badly influence the photographic properties and added to the solution for forming the undercoating layer. Examples of the organic solvent are alcohols such as methanol, ethanol, isopropanol, etc.; ketones such as acetone, etc.; glycols such as ethylene glycol, propylene glycol, etc.; esters such as acetic acid esters, etc. It is also possible to dissolve these compounds in a high boiling point organic solvent, a low boiling point organic solvent, or a mixed solvent of the both, followed by emulsion dispersion in the presence of a surface active agent and addition to the solution for forming the undercoating layer. It is further possible to include these compounds in a polymeric compound such as poly(butyl acrylate), followed by dispersion in the presence of a surface active agent and addition to the solution for forming the undercoating layer.

As the hydrophilic colloid (a), there can be used gelatin, albumin, agar, gum arabic, alginic acid, cellulose derivatives such as carboxymethyl cellulose, hydroxyethyl cellulose, etc., synthetic binders such as polyvinyl alcohol, polyacrylamide, polypyrrolidone, etc.

As the p-hydroxybenzoic acid esters, which are one component of (b') component, there can be used methyl p-hydroxybenzoate, ethyl p-hydroxybenzoate, propyl p-hydroxybenzoate, butyl p-hydroxybenzoate, etc.

The p-hydroxybenzoic acid ester is used in an amount of preferably 0.2 to 50% by weight, more preferably 0.2 to 10% by weight based on the weight of the hydrophilic colloid on dry basis. When the amount is too small, no sufficient coating properties of the photographic emulsion layer can be obtained. On the other hand, when the amount is too much, adhesive properties of the photographic emulsion layer become worse and the coating solution for the undercoating layer becomes unstable due to easy deposition of undissolved materials.

Amphoteric surface active agents of the formulae (I) and (II), which are another component of (b') component, are as explained above.

The amphoteric surface active agents of the formulae (I) and (II) are used in an amount of preferably 0.03 to 30% by weight, more preferably 0.05 to 5% by weight, based on the weight of the hydrophilic colloid on dry basis. When the amount is too small, no sufficient coating properties of the photographic emulsion layer can be obtained. On the other hand, when the amount is too much, adhesive properties of the photographic emulsion layer become worse.

The undercoating layer may further contain various additives such as a matting agent, an antistatic agent, an antihalation agent, dyes for coloring, pigments such as white pigments, an anti-fogging agent, a hardner, a fluorescent brightening agent, other surface active agents, etc., depending on purposes.

Examples of the white pigments are titanium dioxide, barium sulfate, calcium sulfate, barium carbonate, calcium carbonate, zinc oxide, etc.

Examples of the anti-fogging agent are benzimidazole, 5-nitrobenzimidazole, benzotriazole, 1-phenyl-5-mercaptotetrazole, and the like tetrazoindenes.

Examples of the hardner are inorganic compounds such as chromium alum, mucochloric acid, etc.; activated halogen compounds such as halogen-containing triazine compounds; vinylsulfone series compounds, epoxy series compounds, ethyleneimino series compounds, methanesulfonic acid ester series compounds, carbodiimide series compounds, isooxazole series compounds, acrylamide series compounds, etc.

The coating amount of the undercoating layer is preferably 0.01 $g/m^2$ to 1.0 $g/m^2$, more preferably 0.02 $g/m^2$ to 0.5 $g/m^2$ on dry basis. When the coating amount is too small, sufficient adhesive properties of the photographic emulsion layer cannot be obtained. On the other hand, when the coating amount is too much, coating unevenness of the photographic emulsion layer easily takes place and there takes place blocking to the rear side when stored in wound up state.

The undercoating layer can be formed by a conventional coating method such as a dip coating method, an air knife coating method, a curtain coating method, a roller coating method, a wire bar coating method, a gravure coating method, an extrusion coating method using a hopper (disclosed in U.S. Pat. No. 2,681,294), etc. Among these methods, the air knife coating method, the curtain coating method, and the extrusion coating method are more preferable.

As the base sheet on which the undercoating layer is formed, there can be used any materials which are generally used as photographic paper. Examples of such paper are those made from natural pulp, synthetic pulp, and a mixture thereof. The base sheet may contain conventionally used additives such as a sizing agent, a fixing agent, a strength agent, fillers, an antistatic agent, a fluorescent brightening agent, dyes, etc., depending on purposes. Further, a surface sizing agent, a surface strength agent, a fluorescent brightening agent, an antistatic agent and the like can be coated on surface(s) of the base sheet.

The thickness of the base sheet is not particularly limited, but in usual, 50 to 300 μm. It is preferable to use a base sheet having smooth surfaces obtained by, for example, pressing with a calender after paper making. The basis weight of the base sheet is preferably 40 $g/m^2$ to 250 $g/m^2$.

As a resin for covering the base sheet, there can be used polyolefin resins and resins which can be cured by electron beams.

Examples of the polyolefin resins are homopolymers of olefins such as low-density polyethylene, high-density polyethylene, polypropylene, polybutene, polypentene, etc.; copolymers of different kinds of olefins such as ethylene-propylene copolymer, etc.; and a mixture thereof. Polyolefin resins having different densities and/or melt indexes can be used alone or as a mixture thereof.

Examples of the resins curable by electron beams are those having unsaturated bonds of C═C such as acryloyl groups or methacryloyl groups in the molecular chain or molecular terminals. Preferable examples are ester acrylate resins, ester methacrylate resins, epoxy acrylate resins, epoxy methacrylate resins, urethane acrylate resins, urethane methacrylate resins, monofunctional acrylate resins, monofunctional methacrylate resins, polyfunctional acrylate resins, polyfunctional methacrylate resins, etc.

The resin for coating the base sheet may contain various additives such as white pigments such as titanium oxide, zinc oxide, talc, calcium carbonate, etc., fatty acid amide such as stearic acid amide, arachic acid amide, etc.; fatty acid metal salts such as zinc stearate, calcium stearate, aluminum stearate, magnesium stearate, zirconium stearate, sodium palmitate, calcium palmitate, sodium laurate, etc.; antioxidants such as tetrakis[methylene-3-(3,5-di-tert-butyl-4-hydroxyphenyl)-propionate]methane, 2,6-di-tert-butyl-4-methylphenol, etc.; blue pigments and dyes such as cobalt blue, Prussian blue, ultramarine blue, cerulean blue, phthalocyanine blue, etc.; magenta pigments and dyes such as cobalt violet, fast violet, manganese violet, etc.; fluorescent brightening agents such as bis(tert-butyl-benzoxazole)thiophene, bis(methylbenzoxazole)naphthalene, etc.; ultraviolet absorbents such as Tinuvin 320, 326, and 328, (trade names, mfd. by Ciba-Geigy Ltd.), etc. These additives can be used alone or as a mixture thereof depending on purposes.

In the case of coating a polyolefin resin on a running base sheet in the production of photographic support, there can be used a so-called extrusion coating method wherein a molten resin is casted on the base sheet to cover both sides thereof. In the case of coating a resin curable by electron beams on the base sheet, the resin is coated on the base sheet using a conventionally used coater such as a gravure coater, a blade coater, etc., followed by irradiation with electron beams to cure the resin for coating.

It is preferable to subject the base sheet to an activation treatment such as a corona discharge treatment, a flame treatment, or the like before coating with the resin. The front side of the resin coated base sheet to be coated with the photographic emulsion may have a glossy surface, a matted surface, a silky surface or the like depending on purposes. The rear side of the resin coated base sheet usually has a glossless surface. The front side, and if necessary the rear side also, may be subjected to the activation treatment such as a corona discharge treatment, a flame treatment, or the like. The thickness of the resin layer on the base sheet is not particularly limited but in usual about 5 to 50 μm.

The photographic support can have a back coating layer on the opposite side of the undercoating layer. The back coating layer may contain one or more inorganic antistatic agents, organic antistatic agents, hydrophilic binders, latexes, curing agents, pigments, surface active agents, etc.

The photographic support of this invention is used for forming various kinds of photographic constituting layer(s) on the undercoating layer to produce color photographic printing paper, black-and-white photographic printing paper, phototypographic paper, copying paper, reversal photographic paper, negative and positive paper for a silver salt diffusion transfer method, printing materials, etc. For example, it is possible to form an emulsion layer of silver chloride, silver bromide, silver chlorobromide, silver iodobromide, and silver chloroiodobromide. When a coupler is contained in a silver halide photographic emulsion layer, there can be obtained a multi-layer silver halide photographic constructing layers. It is also possible to form a silver salt diffusion transfer image receiving layer by including a physical developing nucleus therein.

As a binder for these photographic constructing layers, there can be used gelatin, and hydrophilic polymeric materials such as polyvinyl pyrrolidone, polyvinyl alcohol, sulfate esters of polysaccharides, etc.

The photographic constructing layers may contain various additives, for example, sensitizing colorants such as cyanine dyes, merocyanine dyes, etc.; chemical sensitizers such as water-soluble gold compounds, sulfur-containing compounds, etc.; anti-fogging agents or stabilizers such as hydroxy-triazolopyrimidine compounds, mercapto-heterocyclic compounds, etc.; hardeners such as formaldehyde, vinylsulfone compounds, aziridine compounds, etc.; coating auxiliaries such as benzenesulfonic acid salts, sulfosuccinic acid ester salts, etc.; anti-staining agents such as dialkyl hydroquinone compounds, etc.; fluorescent brightening agents; sharpness improving colorants; antistatic agents; pH adjusting agents; fogging agents; etc. Further, it is possible to include a water-soluble iridium compound, a water-soluble rhodium compound, or the like so as to act in combination at the time of producing and dispersing the silver halide.

The photographic emulsion layer can be formed by using a conventional coating method such as a dip coating method, an air knife coating method, a curtain coating method, an extrusion coating method using a slide hopper (disclosed in U.S. Pat. No. 2,761,419). If necessary, two or more layers can be coated at the same time. When the emulsion is coated at a rate of 180 m/min or more, the performance of the undercoating layer is exhibited remarkably.

The resulting silver halide photographic material is subjected to treatments such as exposure to light, development, stoppage, fixing, bleaching, stabilization and the like as disclosed in G. Miyamoto, "Photographic Photo-sensitive Materials and Their Treating Methods" (Photographic Technology Lecture vol. 2, published by Kyoritsu Publishing Co., Ltd. 1953) depending on photographic materials used. Particularly, in the case of a multi-layer silver halide colored photographic material wherein a one-bath bleach fixing treatment is conducted after coloring development, it is possible to use any coloring developing solutions such as CD-III, CD-IV (trade names mfd. by Eastman Kodak Co.), Hydroxychrome (a trade name, mfd. by May and Baker Co.) for the treatment. Such developing solutions may contain a development accelerating agent such as benzyl alcohol, a thallium salt, phenidone and the like. A useful one-bath bleach fixing agent is a solution of a metal salt of aminopolycarboxylic acid (e.g. ferric complexes of ethylenediaminetetraacetic acid, propylenediaminetetraacetic acid, etc.). As the fixing agent, there can be used sodium thiosulfate, ammonium thiosulfate, etc. The one-bath bleach fixing agent solution may contain various additives such as a silver removing accelerator (e.g., mercaptocarboxylic acid disclosed in U.S. Pat. No. 3,512,979; mercaptoheterocyclic compounds disclosed in Belgian Patent No. 682,426), an anti-staining agent, a pH adjusting or buffering agent, a hardener (e.g. magnesium sulfate, aluminum sulfate, potassium alum, etc.), surface active agents, etc. The one-bath bleach fixing agent solution can be used in various pH ranges, preferably in the pH range of 6.0 to 8.0.

This invention is explained in detail referring to Examples, in which all parts and percents are by weight, unless otherwise specified.

EXAMPLE 1

Both sides of a base sheet having a basis weight of 170 $g/m^2$ were subjected to a corona discharge treatment. A rear side of the base sheet was coated with a 1:1 mixture of high-density polyethylene (density 0.96 $g/cm^3$, MI=5) and low-density polyethylene (density 0.92 $g/cm^2$, MI=5) using a melt extruder at a resin temperature of 330° C. to form a coating in 30 μm thickness. Then, a front side of the base sheet was coated with a 7:3 mixture of the low-density polyethylene containing 10% of anatase type titanium oxide and the high-density polyethylene using the melt extruder at resin temperature of 330° C. to form a coating in 30 μm thickness.

The surface of polyethylene layer containing titanium oxide was subjected to a corona discharge treatment using a corona discharge treating apparatus. On the corona discharge treated surface, a solution of 1% gelatin containing a compound of the formula:

$$C_{12}H_{25}-{}^{\oplus}\underset{CH_3}{\overset{CH_3}{N}}-C_3H_6-SO_3^{\ominus} \qquad \text{(I-1)}$$

in an amount of 0.03%, 0.3%, 0.6%, 5.0%, or 30.0% based on the weight of gelatin, or containing no compound of the formula (I-1) was coated using a wire bar coater, respectively, so as to form an undercoating layer with a coating amount of 0.1 $g/m^2$ on dry basis, followed by drying at 120° C. for 30 seconds. On an undercoating layer thus prepared or the polyethylene coated base sheet having no undercoating layer thereon and treated by corona discharge, a usual silver halide emulsion for printing paper was coated.

The thus obtained photographic material samples were developed by a conventional method and observed by the naked eyes to judge coating unevenness of the emulsion layer (evaluation with 5 grades, numeral 5 being the best and numeral 1 is the worst, numeral 4 or higher being practically usable). Influences on emulsion performance (mainly fogging and sensitivity) were tested by photographic sensitometry. The results are shown in Table 1.

TABLE 1

| Run No. | Amount of compound (I-1) (%) | Coating unevenness | Bad influences on emulsion performances |
|---|---|---|---|
| 1 | 0.03 | 4 | None |
| 2 | 0.3 | 5 | " |
| 3 | 0.6 | 5 | " |
| 4 | 5.0 | 5 | " |
| 5 | 30.0 | 4 | " |
| 6 | 0 | 3 | None |
| 7 | Corona discharge | 3 | Yes |

TABLE 1-continued

| Run No. | Amount of compound (I-1) (%) | Coating unevenness | Bad influences on emulsion performances |
|---|---|---|---|
| | treatment | | |

As shown in Table 1, the coating unevenness of photographic emulsion layer can be improved by addition of the compound of the formula (I-1) without giving bad influences on emulsion performances.

EXAMPLE 2

A polyethylene coated base sheet was obtained in the same manner as described in Example 1. On the corona discharge treated surface of the resin coated base sheet obtained in the same manner as described in Example 1, a 0.2% gelatin solution containing a compound of the formula:

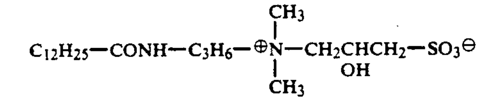

(II-1)

so as to make the content thereof 0.8% after dried based on the weight of the gelatin in the undercoating layer was coated in an amount of 0.009 $g/m^2$ (comparison), or 0.02 $g/m^2$ on solid basis. On one hand, a 1% gelatin solution containing the compound of the formula (II-1) so as to make the content thereof 0.8% based on the solid weight of the gelatin in the undercoating layer was coated in an amount of 0.1 $g/m^2$ or 0.5 $g/m^2$ on dry basis on the corona discharge treated surface of the resin coated base sheet. On the other hand, a 10% gelatin solution containing the compound of the formula (II-1) so as to make the content thereof 0.8% based on the solid weight of the gelatin in the undercoating layer was coated in an amount of 1.4 $g/m^2$ (comparison) on dry basis on the corona discharge treated surface of the resin coated base sheet. In the above-mentioned coating, a wire bar coating method was used and drying conditions were at 120° C. for 30 seconds. Using the resulting photographic supports, photographic material samples were prepared and subjected to the same tests as described in Example 1. For comparison a photographic support having no undercoating layer thereon but subjected to only the corona discharge treatment was also used to prepare a photographic material sample, which was subjected to the same tests as mentioned above. The results are shown in Table 2.

TABLE 2

| Run No. | Coating amount of undercoating layer | Coating unevenness | Bad influences on emulsion performances |
|---|---|---|---|
| 1 | 0.02 $g/m^2$ | 4 | None |
| 2 | 0.1 | 5 | " |
| 3 | 0.5 | 5 | " |
| 4 | 1.4 | 3 | Almost none |
| 5 | 0.009 | 1 | " |
| 6 | 0 corona discharge treatment | 3 | Yes |

As shown in Table 2, when the coating amount of the undercoating layer containing the compound of the formula (II-1) is 0.02 $g/m^2$, 0.1 $g/m^2$ and 0.5 $g/m^2$, the coating unevenness is improved remarkably and there are no bad influences on emulsion performances. On the other hand, when the coating amount of the undercoating layer is 1.4 $g/m^2$, there take place larger curling and blocking to the rear side when piled up. Therefore, this cannot be used practically. Further, when the coating amount of the undercoating layer is 0.009 $g/m^2$, covering of the polyethylene surfaces is incomplete so as to cause cissing and to make the coating properties of the emulsion insufficient.

EXAMPLE 3

The process of Example 1 was repeated except for using a 1% gelatin aqueous solution containing a compound of the formula (I-2), (I-3), (II-2), or (II-3) or Comparative Compound (1) or Comparative Compount (2) in an amount of 1.0% on dry basis based on the solid weight of gelatin and making the coating amount of the undercoating layer 0.12 $g/m^2$ after dried. The coating unevenness and the bad influences on the emulsion performances were tested in the same manner as described in Example 1. The results are shown in Table 3.

TABLE 3

| Run No. | Compound | Coating unevenness | Bad influences on emulsion performances |
|---|---|---|---|
| 1 | (I-2) | 4 | None |
| 2 | (I-3) | 5 | " |
| 3 | (II-2) | 5 | " |
| 4 | (II-3) | 5 | " |
| 5 | Comparative compound (1) | 2 | Almost none |
| 6 | Comparative compound (2) | 1 | " |

Note Comparative compound (1):

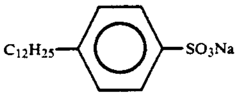

Comparative compound (2):
$C_{12}H_{25}-O-SO_3Na$

Compound (I-2):

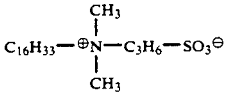

Compound (I-3):

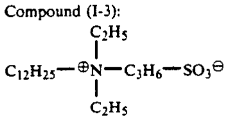

Compound (II-2):

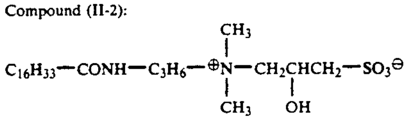

Compound (II-3):

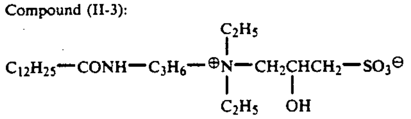

EXAMPLE 4

A mixed stuff comprising 50 parts of a bleached kraft pulp of hardwood and 50 parts of a sulfite pulp of softwood was beaten to Canadian Standard Freeness of 310 ml and subjected to paper making of a 170 $g/m^2$ weight paper using the following ingredients.

| | |
|---|---|
| Puls (LBKP/NBKP = 1/1) | 100 parts |
| Fluorescent brightening agent | 0.15 |
| Blue dye | 0.00005 |
| Fatty acid soap | 1.0 |
| Alumina sulfate | 1.0 |
| Polyamide-polyamine-epichlorohydrin resin | 0.4 |
| Polyacrylamide | 0.5 |
| Cationized starch | 4.0 |

The resulting wet paper was dried with a heating plate at 110° C. Into this paper, the following impregnating solution was impregnated in an amount of 25 g/m$^2$ and dried in a hot air drier at 110° C.

| Impregnating solution: | |
|---|---|
| Carboxy-modified polyvinyl alcohol | 4.0 parts |
| Fluorescent brightening agent | 0.05 |
| Blue dye | 0.002 |
| Calcium chloride | 3.0 |
| Water | To make total amount 100 |

The impregnated and dried paper was subjected to a supercalender treatment under a linear pressure of 90 kg/cm, followed by corona discharge treatment on both sides thereof. On a rear side of the paper, a 1:1 mixture of high-density polyethylene (density 0.96 g/cm$^3$, MI =5) and low-density polyethylene (density 0.92 g/cm$^3$, MI=5) was coated to a thickness of 30 μm using a melt extrusion coating machine at a resin temperature of 330° C. On a front side of the paper, a resin composition of the low-density polyethylene containing 10% anatase type titanium oxide and the high-density polyethylene (7:3 in weight ratio) was coated to a thickness of 30 μm at the resin temperature of 300° C.

The titanium oxide-containing polyethylene surface was subjected to corona discharge treatment, followed by coating of a undercoating solution having the composition as listed in Table 4 (a total amount 100 g). The resulting undercoating layer (4.5 g/m$^2$ as a liquid) was dried at 80° C. for 2 minutes.

On the other hand, the undercoating solution was stored at 40° C. for 24 hours to judge putrefaction and decomposition by means of an odor and turbidity. The results are shown in Table 5.

Then, on the undercoating layer coated on the base paper, a usual color photographic silver halide emulsion was coated to give a color printing paper sample. The color printing paper sample was subjected to the following tests. The results are shown in Table 5.

TEST METHODS

(1) Coatability of emulsion on photographic support from the beginning of coating Coatability of a photographic emulsion on a running photographic support from the beginning of coating was evaluated by the distance (m) on the support from the beginning of the coating to a point where the emulsion was coated well. The smaller the figure, the better coatability. The emulsion was coated on the running photographic support at a rate of 200 m/min.

(2) Coating unevenness

A color printing paper sample was developed by a conventional method and coating unevenness of a photographic emulsion was judged by the naked eye with the following evaluation: O no coating unevenness, Δ coating unevenness appears slightly, and X coating unevenness appears on the whole surface.

(3) Adhesiveness of emulsion layer (dry)

A plurality of squares were inscribed on a photographic emulsion layer of a color printing paper sample with a razor blade. Cellophane tape was then applied to the cross hatched area and peeled off rapidly. A measure of adhesiveness was determined by percentages of remaining area of the emulsion layer.

(4) Adhesiveness of emulsion layer (wet)

A plurality of squares were inscribed on a photographic emulsion layer of a color printing paper sample with a sharp edged blade, in a treating bath containing CD-III as a developer at 30° C., followed by rubbing with human fingers in the treating bath to measure the remaining percentage of the emulsion layer. The remaining percentage of 80% or more is practically usable.

(5) Preservation of undercoating solution (a) Evaluation of odor
O : Odorless
Δ : Slight smell
X : Strong smell

(6) Evaluation of turbidity

O : Clear
Δ : Slightly turbid
X : Considerably turbid

TABLE 4

| Run No. | Gelatin (g) | Chromium alum (mg) | p-Hydroxybenzoate Compound | p-Hydroxybenzoate Amount (mg) | Preservative Compound | Preservative Amount (mg) |
|---|---|---|---|---|---|---|
| 1 | 1.0 | 10 | — | — | III-1 | 5 |
| 2 | " | " | — | — | IV-1 | 5 |
| 3 | " | " | Methyl p-hydroxybenzoate | 2 | III-1 | 5 |
| 4 | " | " | Butyl p-hydroxybenzoate | 2 | " | 5 |
| 5 | " | " | Methyl p-hydroxybenzoate | 5 | " | 5 |
| 6 | " | " | Methyl p-hydroxybenzoate | 50 | " | 5 |
| 7 | " | " | Methyl p-hydroxybenzoate | 0.5 | " | 5 |
| 8 | " | " | Methyl p-hydroxybenzoate | 50 | IV-1 | 5 |
| 9 | " | " | Butyl p-hydroxybenzoate | 5 | III-1 | 5 |

TABLE 4-continued

| Run No. | Gelatin (g) | Chromium alum (mg) | p-Hydroxybenzoate Compound | p-Hydroxybenzoate Amount (mg) | Preservative Compound | Preservative Amount (mg) |
|---|---|---|---|---|---|---|
| 10 | " | " | Butyl p-hydroxybenzoate | 0.5 | " | 5 |
| 11 | 1.0 | 10 | Methyl p-hydroxybenzoate | 50 | — | — |
| 12 | " | " | Butyl p-hydroxybenzoate | 50 | — | — |
| 13 | " | " | Methyl p-hydroxybenzoate | 50 | III-1 | 0.5 |
| 14 | " | " | Methyl p-hydroxybenzoate | 50 | " | 50 |
| 15 | " | " | Methyl p-hydroxybenzoate | 50 | IV-1 | 0.5 |
| 16 | " | " | Methyl p-hydroxybenzoate | 50 | " | 50 |
| 17 | " | " | Ethyl p-hydroxybenzoate | 50 | III-1 | 5 |
| 18 | " | " | Propyl p-hydroxybenzoate | 50 | " | 5 |
| 19 | " | " | Butyl p-hydroxybenzoate | 50 | " | 5 |
| 20 | " | " | Butyl p-hydroxybenzoate | 50 | III-2 | 5 |
| 21 | " | " | Butyl p-hydroxybenzoate | 50 | IV-2 | 5 |

Note Preservatives:

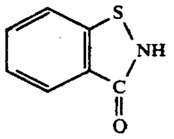

III-1

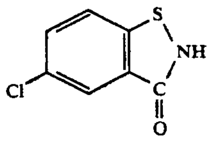

III-2

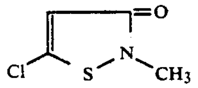

IV-1

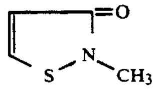

IV-2

TABLE 5

| Run No. | Preservation of undercoating solution: Odor | Preservation of undercoating solution: Turbidity | Coating and adhesive properties of emulsion layer: (1) Coatability of emulsion (m) | (2) Coating unevenness | (3) Adhesiveness (dry) (%) | (4) Adhesiveness (wet) (%) |
|---|---|---|---|---|---|---|
| 1 | O | O | 10 | X | 10 | 0 |
| 2 | O | O | 10 | X | 10 | 0 |
| 3 | O | O | 6 | Δ | 30 | 5 |
| 4 | O | O | 4 | Δ | 40 | 10 |
| 5 | O | O | 0.5 | O | 90 | 90 |
| 6 | O | O | 0 | O | 100 | 100 |
| 7 | O | O | 0 | O | 90 | 90 |
| 8 | O | O | 0 | O | 100 | 100 |
| 9 | O | O | 0.5 | O | 90 | 100 |
| 10 | O | O | 0 | O | 100 | 100 |
| 11 | X | X | 1 | O | 80 | 70 |
| 12 | Δ | X | 1.5 | O | 80 | 90 |
| 13 | O | O | 0 | O | 100 | 100 |
| 14 | O | O | 0 | O | 100 | 100 |
| 15 | O | O | 0 | O | 100 | 100 |
| 16 | O | O | 0 | O | 100 | 100 |
| 17 | O | O | 0 | O | 100 | 100 |
| 18 | O | O | 0 | O | 100 | 100 |

TABLE 5-continued

| | Preservation of undercoating solution | | Coating and adhesive properties of emulsion layer | | | |
|---|---|---|---|---|---|---|
| Run No. | Odor | Turbidity | (1) Coatability of emulsion (m) | (2) Coating unevenness | (3) Adhesiveness (dry) (%) | (4) Adhesiveness (wet) (%) |
| 19 | O | O | 0 | O | 100 | 100 |
| 20 | O | O | 0 | O | 100 | 100 |
| 21 | O | O | 0 | O | 100 | 100 |

EXAMPLE 5

Using the undercoating solution of Run No. 6 of Example 4, the tests (1) to (4) of Example 4 was repeated except for changing the coating amounts of the undercoating layers as listed in Table 6. The results are shown in Table 6.

TABLE 6

| | | Coating and adhesive properties of emulsion layer | | | |
|---|---|---|---|---|---|
| Run No. | Coating amount of undercoating layer ($g/m^2$) | (1) Coatability of emulsion (m) | (2) Coating unevenness | (3) Adhesiveness (dry) (%) | (4) Adhesiveness (wet) (%) |
| 1 | 0.004 | 8 | Δ | 50 | 10 |
| 2 | 0.008 | 2 | O | 80 | 80 |
| 3 | 0.045 | 0 | O | 100 | 100 |
| 4 | 0.2 | 0 | O | 100 | 100 |
| 5 | 0.3 | 0 | X | 100 | 100 |
| 6 | *0.6 | 0 | X | 100 | 100 |

Note
*Blocking was admitted when the photographic support was stored in wound up state.

As is clear from the results of Tables 5 and 6, only the undercoating layes obtained according to the present invention are excellent in preservative properties and provide excellent coating and adhesive properties of the photographic emulsion layers.

EXAMPLE 6

Photographic supports were produced in the same manner as described in Example 4 using the undercoating solutions as listed in Table 7. The resulting photographic supports were subjected to the same tests (1) to (4) as in Example 4. The results are shown in Table 8.

TABLE 7

| | | | Surface active agent | | Preservative | |
|---|---|---|---|---|---|---|
| Run No. | Gelatin (g) | Chromium alum (mg) | Compound | Amount (mg) | Compound | Amount (mg) |
| 1 | 1.0 | 10 | Na lauryl benzenesulfonate | 10 | III-1 | 5 |
| 2 | " | " | Na lauryl benzenesulfonate | 10 | IV-1 | 5 |
| 3 | " | " | N,N-Dimethyllaurylamine.HCl | 10 | III-1 | 5 |
| 4 | " | " | N,N-Dimethyllaurylamine.HCl | 10 | IV-1 | 5 |
| 5 | " | " | Polyoxyethylene lauryloleyl ether | 10 | III-1 | 5 |
| 6 | " | " | Polyoxyethylene lauryloleyl ether | 10 | IV-1 | 5 |
| 7 | " | " | I-1 | 0.3 | III-1 | 5 |
| 8 | " | " | II-1 | 0.3 | " | 5 |
| 9 | " | " | I-1 | 10 | Butyl p-hydroxybenzoate<br>III-1 | 20<br>5 } |
| 10 | " | " | " | 0.5 | III-1 | 5 |
| 11 | 1.0 | 10 | I-1 | 10 | III-1 | 5 |
| 12 | " | " | " | 300 | " | 5 |
| 13 | " | " | " | 10 | IV-1 | 5 |
| 14 | " | " | II-1 | 10 | III-1 | 5 |
| 15 | " | " | " | 10 | IV-1 | 5 |
| 16 | " | " | I-1 | 10 | — | — |
| 17 | " | " | II-1 | 10 | — | — |
| 18 | " | " | I-1 | 10 | Phenol | 5 |
| 19 | " | " | " | 10 | Butyl p-hydroxybenzoate | 5 |
| 20 | " | " | " | 10 | III-1 | 0.5 |
| 21 | " | " | " | 10 | IV-1 | 0.5 |
| 22 | " | " | " | 10 | III-1 | 50 |
| 23 | " | " | II-1 | 10 | " | 0.5 |
| 24 | " | " | " | 10 | " | 50 |
| 25 | 1.0 | 10 | I-1 | 10 | III-2 | 5 |

TABLE 7-continued

| Run No. | Gelatin (g) | Chromium alum (mg) | Surface active agent Compound | Surface active agent Amount (mg) | Preservative Compound | Preservative Amount (mg) |
|---|---|---|---|---|---|---|
| 26 | " | " | " | 10 | IV-2 | 5 |

Note Surface active agent:
Compound I-1:

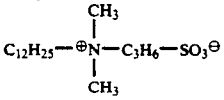

Compound II-1:

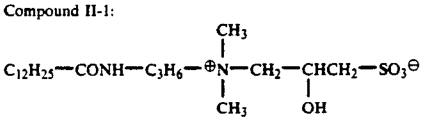

Compound III-1
Compound IV-1
Compound III-2
Compound IV-2
} See Note of Table 4.

TABLE 8

| Run No. | Preservation of undercoating solution: Odor | Preservation of undercoating solution: Turbidity | (1) Coatability of emulsion (m) | (2) Coating unevenness | (3) Adhesiveness (dry) (%) | (4) Adhesiveness (wet) (%) |
|---|---|---|---|---|---|---|
| | | | Coating and adhesive properties of emulsion layer | | | |
| 1 | O | O | 10 | X | 10 | 0 |
| 2 | O | O | 10 | X | 10 | 0 |
| 3 | O | O | 7 | Δ | 15 | 5 |
| 4 | O | O | 6 | Δ | 25 | 5 |
| 5 | O | O | 8 | X | 15 | 0 |
| 6 | O | O | 10 | X | 15 | 0 |
| 7 | O | O | 9 | Δ | 50 | 30 |
| 8 | O | O | 6 | Δ | 60 | 40 |
| 9 | O | O | 0 | O | 100 | 100 |
| 10 | O | O | 0.5 | O | 100 | 100 |
| 11 | O | O | 0 | O | 100 | 100 |
| 12 | O | O | 0 | O | 100 | 100 |
| 13 | O | O | 0 | O | 100 | 100 |
| 14 | O | O | 0 | O | 100 | 100 |
| 15 | O | O | 0 | O | 100 | 100 |
| 16 | X | X | 5 | X | 10 | 0 |
| 17 | X | X | 5 | X | 10 | 0 |
| 18 | Δ | Δ | 8 | Δ | 15 | 10 |
| 19 | X | X | 6 | X | 15 | 0 |
| 20 | O | O | 0 | O | 100 | 100 |
| 21 | O | O | 0 | O | 100 | 100 |
| 22 | O | O | 0 | O | 100 | 100 |
| 23 | O | O | 0 | O | 100 | 100 |
| 24 | O | O | 0 | O | 100 | 100 |
| 25 | O | O | 0 | O | 100 | 100 |
| 26 | O | O | 0 | O | 100 | 100 |

As is clear from the results in Table 8, the undercoating layers obtained according to the present invention are excellent in preservative properties and provide excellent coating and adhesive properties of the photographic emulsion layers.

What is claimed is:

1. A photographic support comprising a resin coated base sheet and formed thereon an undercoating layer comprising (a) a hydrophilic colloid, and (b) at least one compound selected from the group consisting of a compound of the formula:

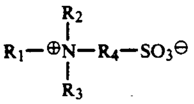

(I)

wherein $R_1$, $R_2$ and $R_3$ are independently hydrogen or an alkyl group; and $R_4$ is an alkylene group, and a compound of the formula:

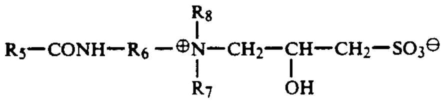

(II)

wherein $R_5$, $R_7$ and $R_8$ are independently hydrogen or an alkyl group; and $R_6$ is an alkylene group, the coating amount of said undercoating layer being 0.01 g/m$^2$ to 1.0 g/m$^2$ on dry basis.

2. A photographic support according to claim 1, wherein the compounds of the formulae (I) and (II) are:

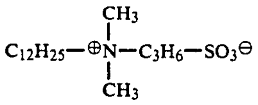

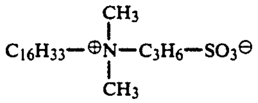

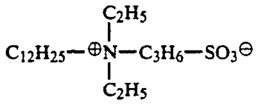

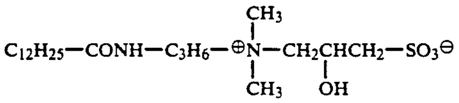

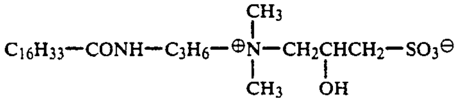

and

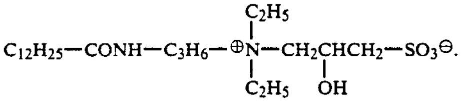

3. A photographic support comprising a resin coated base sheet and formed thereon an undercoating layer comprising (a) a hydrophilic colloid, (b') at least one member selected from the group consisting of p-hydroxybenzoic acid esters and compounds represented by the formulae:

(I)

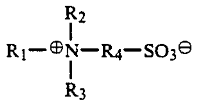

wherein $R_1$, $R_2$ and $R_3$ are independently hydrogen or an alkyl group; and $R_4$ is an alkylene group, and (II)

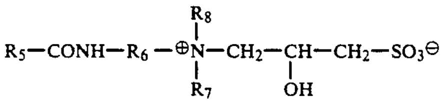

wherein $R_5$, $R_7$ and $R_8$ are independently hydrogen or an alkyl group; and $R_6$ is an alkylene group, and (c) at least one compound selected from the group consisting of a compound of the formula:

(III)

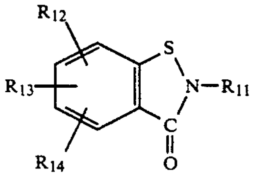

wherein $R_{11}$ is hydrogen, an alkyl group or an alkoxy group; $R_{12}$, $R_{13}$ and $R_{14}$ are independently hydrogen, halogen, an alkyl group, an alkoxy group, a cyano group or a nitro group, and a compound of the formula:

(IV)

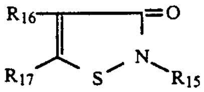

wherein $R_{15}$ is hydrogen, an alkyl group, a cycloalkyl group, an alkenyl group, an aralkyl group, an aryl group or a heterocylic group, or a group of the formula: $-CONHR_9$ in which $R_9$ is an alkyl group, an aryl group, an alkylthio group, an arylthio group, an alkylsulfonyl group or an arylsulfonyl group),; $R_{16}$ and $R_{17}$ are independently hydrogen, halogen, an alkyl group, a cycloalkyl group, an aryl group, a heterocyclic group, a cyano group, an alkylthio group, an arylthio group, an alkylsulfoxide group, an alkylsulfinyl group or an alkylsulfonyl group.

4. A photographic support according to claim 3, wherein the component (b') is a p-hydroxybenzoic acid ester.

5. A photographic support according to claim 3, wherein the component (b') is at least one compound selected from the group consisting of the compounds of the formulae (I) and (II).

6. A photographic support according to claim 5, wherein the compounds of the formulae (I) and (II) are:

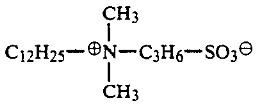

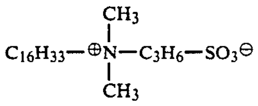

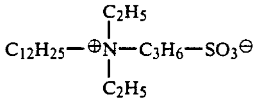

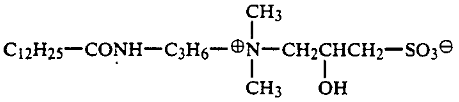

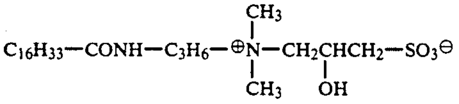

and

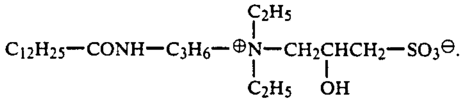

7. A photographic support according to claim 3, wherein the component (b') is a p-hydroxybenzoic acid ester and at least one compound selected from the group consisting of the compounds of the formulae (I) and (II).

8. A photographic support according to claim 3, wherein the hydrophilic colloid is gelatin.
9. A photographic support according to claim 3, wherein the component (c) is at least one compound selected from the group consisting of
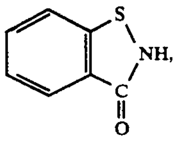
-continued
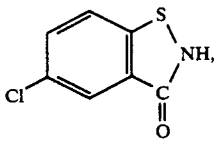
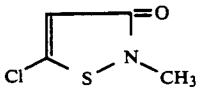
and
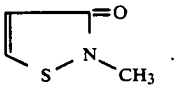
* * * * *